United States Patent [19]

Morris et al.

[11] 4,161,036

[45] Jul. 10, 1979

[54] METHOD AND APPARATUS FOR RANDOM AND SEQUENTIAL ACCESSING IN DYNAMIC MEMORIES

[75] Inventors: S. Brent Morris, Columbia; Arthur Valliere, III, Arnold; Richard A. Wisniewski, Severna Park, all of Md.

[73] Assignee: United States of America, Director National Security Agency, Washington, D.C.

[21] Appl. No.: 849,561

[22] Filed: Nov. 8, 1977

[51] Int. Cl.$^2$ .............................................. G06F 7/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,605,024 | 9/1971 | Batcher | 364/900 |
| 3,810,112 | 5/1974 | Aho et al. | 364/900 |

OTHER PUBLICATIONS

H. S. Stone, "Dynamic Memories with Enhanced Data Access," IEEE Trans. Comput. vol. c-21, No. 4, pp. 359-366, 1972.
H. S. Stone, "Dynamic Memories with Fast Random and Sequential Access," IEEE Trans Comput., vol. c-24, No. 12, pp. 468-1174, 1975.
A. J. Aho & J. D. Ullman, "Dynamic Memories with Rapid Random and Seqential Access" IEEE Trans. Comput. vol. c-23, No. 3, pp. 272-276, 1974.

*Primary Examiner*—Gareth D. Shaw
*Assistant Examiner*—C. T. Bartz
*Attorney, Agent, or Firm*—John R. Utermohle; Barry N. Young

[57] ABSTRACT

A dynamic memory is disclosed, in which data is rearranged among its internal memory locations in accordance with either of two different shuffle operations. The shuffle operations, an In Shuffle and an Out Shuffle, rearrange the data in a manner similar to the manner in which cards of a deck are rearranged when shuffled. Using only the two shuffle operations, a method of random accessing data in the theoretical minimum time is disclosed, for all odd-sized memories and all memories of size $2^r$. Once a desired datum has been accessed, successive data can be sequentially accessed in unit time. Processes for sequential accessing of data are shown to be related to the existence of sequences of In and Out Shuffles which move each datum through the read/write window of the memory, which sequences are defined as tours. A method for determining the existence of and for constructing tours for certain sized memories is also disclosed. An address register that keeps track of the current address of the datum appearing in the index window of the memory, which is sufficient to define the entire memory configuration, operates in conjunction with control means to calculate I-O sequences for random accessing of data.

21 Claims, 7 Drawing Figures

METHOD AND APPARATUS FOR RANDOM AND SEQUENTIAL ACCESSING IN DYNAMIC MEMORIES

BACKGROUND OF THE INVENTION

Field of the Invention

This invention relates to dynamic memory systems generally and in particular to dynamic memories employing non-cyclic memory transformations and processes for rapid random and sequential accessing of data in such memories.

Dynamic memories are memories in which the data stored in the memory cells are constantly being rearranged in accordance with operations called memory transformations, which are applied to the memory. An example of one of the simplest types of such memories is a shift register employing a cyclic end-around shift. Individual data are stored in each shift register stage, with one of such stages being used as a read/write port for the input and the output of data. Each datum is shifted from one stage to the next, end-around. In order to access a given datum to the read/write port of a shift register memory of size N, on the average, $(N-1)/2$ cyclic shifts are necessary. For reasonable size memories, N is usually quite large and consequently, long access times are involved. This is a significant disadvantage with cyclically interconnected shift register memories.

Once a given datum has been randomly accessed, it is commonly required to sequentially access successive data stored in adjacent memory cells. The cyclic shift register has the advantage that sequential accessing of data can be performed in unit time, i.e., each additional datum can be accessed with one shift. Unfortunately, this advantage is usually more than off-set by the lengthy random access time required for the first datum.

In order to reduce the access time of dynamic memories, various complex interconnection schemes have been proposed for performing non-cyclic memory transformations for rearranging the data. One such transformation is the so-called "perfect shuffle" in which the data is rearranged in a manner similar to one in which the cards of a deck are rearranged when shuffled. To illustrate, if a deck of cards is divided in half and the cards from the two halves are perfectly interlaced with the previously top card remaining on top, the resulting arrangement of the deck is equivalent to the rearrangement of data in a dynamic memory as a result of the perfect shuffle operation. Such a memory transformation may be easily implemented in a shift register dynamic memory by simply interconnecting the appropriate inputs and outputs of the shift register stages. Upon the application of a shift control signal to the shift register, the contents of the register stages are simultaneously rearranged in accordance with the interconnections among stages. In order to employ this and similar non-cyclic types of memory transformations, accessing algorithms must obviously be found which will keep track of the memory state and permit the desired data to be accessed.

Another transformation which has been proposed is the "exchange shuffle" in which the contents of adjacent even-odd stages are first pairwise interchanged, then the data is rearranged in accordance with the perfect shuffle. A memory employing both the perfect shuffle and exchange shuffle interconnections has been described in "Dynamic Memories With Enhanced Data Access," I.E.E.E. Trans. Comput., vol C-21, No. 4, pp 359–366, 1972, by H. S. Stone. Stone demonstrates that a memory of size $N=2^m$ stages employing these transformations can randomly access data in the theoretical minimum time, shown to be $\log_2 N = m$ units of time. The disadvantages of this memory as described in the paper, are that (1) once a datum has been accessed, each successive datum must be accessed using the random accessing algorithm, there being no convenient algorithm for sequentially accessing successive data in unit time; and (2) Stone's random accessing algorithm is limited to the first cell, cell 0, which is designated as the read/write port of the memory.

Aho and Ullman, U.S. Pat. No. 3,810,112, disclose a shift-shuffle memory system which employs the perfect shuffle and cyclic shift interconnections. This memory has the property that after the first two data of a sequence have been randomly accessed, successive data can be sequentially accessed in unit time, i.e., with each shift of the memory. The disadvantages of this memory are that the random access time for each datum is approximately twice that required by Stone's memory, i.e., twice the theoretical minimum time, but more importantly, Aho and Ullman's memory is limited to memories of size $2^r-1$, i.e., odd-sized memories of size one less than a power of 2. Aho and Ullman's memory also requires that data be accessed through the first stage, stage 0, since the accessing algorithm which they utilize, is limited to this stage alone.

Although not directed to a memory system per se, U.S. Pat. No. 3,605,024 to Batcher, discloses a system similar to that of Aho and Ullman, in which a shift register of length $m=2^p-1$ stages employs shuffle type interconnections among the stages, such that any cyclic end-around shift may be accomplished in p shift times. For example, a 15 stage register, $m=15=2^4-1$, can be shifted any number of places between 0–15 in 4 shift times, using two sets of interconnections between stages. Batcher's system is limited only to registers of certain lengths. All even numbered lengths, including lengths equal to a power of 2 are excluded. Random or sequential accessing of data is not provided.

H. S. Stone in "Dynamic Memories with Fast Random and Sequential Access," I.E.E.E. Trans. Comput., vol C-24, pp 1168–1174, 1975, proposes minor variations and improvements in Aho and Ullman's memory access algorithm which simplifies its implementation and improves the random access time slightly. Stone further discusses his previously proposed perfect shuffle/exchange shuffle memory of a size equal to a power of 2, which has good random access properties but not necessarily the sequential access property. Although Stone recognizes certain advantages to the Aho and Ullman memory, he states at page 1174:

". . . Such memories have an annoying property that they do not contain a number of words equal to a power of 2. Thus if such memories are modularized, it is awkward to construct memories composed of two or more individual memory modules. It is best to have modules containing a number of words exactly equal to a power of 2 in this case, so that modules are selected by specific bits in a binary address."

The problem to which Stone refers is significant where such memories are used in data processing equipment. The architecture of most computers is such that memory modules having a size equal to a power of 2 are required. Otherwise, it becomes difficult to build up memories using individual modules connected together and requires that complex memory addressing schemes be devised.

With respect to sequential accessing in non-cyclically connected memories such as the perfect shuffle/exchange shuffle memory, Stone demonstrates that sequential accessing depends upon the existence of sequences of operations, called tours, which cause each datum in the memory to visit the read/write port exactly once for each complete memory cycle. Stone states that there exist three such distinct tours at the first storage locations for memories of size $2^3=8$, fourteen for memories of size $2^4=16$ and none for memories of size $2^5=32$. The question of the existence of tours for memories of size $2^6=64$ and greater was left unanswered.

Thus, in summary, no prior art memory has been able to combine in one memory, convenient size, minimum theoretical random access time and good sequential accessing properties. Memories such as Stone's shuffle/exchange memory, while possessing good access time and size equal to powers of 2 do not always have good sequential accessing properties. Conversely, in memories such as the Aho and Ullman memory which employs cyclic connections, sequential accessing is always possible. However, such memories do not have good access time and are limited to a size equal to one less than a power of 2, i.e., $N=2^r-1$.

The present invention overcomes these disadvantages by combining in a single memory the flexibility of a memory size equal to any odd number or any power of 2, minumum theoretical random access time and good sequential accessing properties. Furthermore, the accessing algorithms presented permit data to be accessed through any port of the memory, not just the first stage as required by prior art memories.

SUMMARY OF THE INVENTION

The present invention relates to a method of and an apparatus for random and sequential accessing of data in dynamic memories. There is provided a memory having N distinct locations for the storage of data, where N may be any odd number or any power of 2, i.e., $N=2^r$. Interconnections are provided among the various memory locations such that the contents of the memory may be rearranged in accordance with either of two distinct shuffle-type memory transformations. One such shuffle is defined as an Out Shuffle (O), which is the same as the perfect shuffle previously described in reference to prior art memories. The other shuffle is defined as an In Shuffle (I), to be more fully described hereinbelow.

Control means are provided which generate sequences of control signals that rearrange the data in accordance with these two shuffle operations, such that a desired datum may be randomly accessed to the selected read/write window of the memory in the theoretical minimum time. At any given time the memory configuration is completely defined by the address of the datum which appears in a preselected window of the memory designated as the index window, thereby permitting simple accessing algorithms to be provided which determine the required sequence of shuffle operations necessary to access a desired datum to the read/write window of the memory. These algorithms are embodied in the control means provided.

After a first datum is accessed, successive data may be sequentially accessed thereafter to the selected read/write window, by applying to the memory a sequence of shuffles corresponding to a tour for the selected read/write window. Methods are further provided for determining the existence of and for the construction of tours for various size memories.

The invention provides for any desired memory size, the only constraints being those imposed by the physical limitations of the particular technology utilized. A desired memory size may be implemented as a single unitary memory of the desired size or by combining individual memory modules of a smaller size. Particularly advantageous is the fact that the invention provides for memory sizes equal to a power of 2. This facilitates the implementation of a desired memory size in computer systems, by permitting the combining of the required number of memory modules, while obviating the problems attendant to interconnecting non-power of 2 sized memory modules.

Consequently, it is an object of the invention to provide a method for rapid random accessing of data and a memory having improved random access characteristics.

It is a further object of the invention to provide a method of sequential accessing of successive data and a memory having improved sequential access characteristics.

It is a still further object of the invention to provide a method of accessing and a memory in which the memory configuration at any time is defined by the address of the datum appearing in only one window of the memory.

It is also an object of the invention to provide a method of accessing and a memory in which data may be accessed to any selected memory window.

It is additionally an object of the invention to provide a method of accessing, and a memory in which the number of storage locations may be a power of two.

A memory system having these and other advantages may include a dynamic memory having N locations, 0, ..., N−1, for the storage of data, where N may be any odd number or any integer power of 2; In shuffle and Out shuffle interconnections among the storage locations of the memory so that data may be arranged in accordance with In shuffle and Out shuffle operations; and control means connected to the memory and responsive to the input address of a datum to be accessed, for generating a sequence of shuffle operations such that the datum is accessed to a preselected memory location.

A method of accessing data in a dynamic memory providing the aforesaid advantages may include the steps of selecting a storage location to which the datum is to be accessed; determining the address of the datum currently existing in a preselected index storage location; calculating a binary number as a function of the index datum address and the datum to be accessed; and applying a sequence of In Shuffle and Out Shuffle operations defined by the binary number to the memory to rearrange the data therein such that the desired datum appears at the selected storage location.

MATHEMATICAL CONSIDERATIONS

Prior to describing preferred embodiments of the invention, an understanding of the invention will be facilitated by presenting the underlying mathematical considerations.

The size of the memory module, i.e., the number of data storage locations, will be designated by N. The storage locations, which will be referred to as windows, will be labeled $0, 1, 2, \ldots N-1$. The internal address of each datum stored in memory is equal to the number of the window in which the datum is initially stored. That is, when the memory is initially loaded with data, the datum occupying window 0 is assigned address 0; the datum occupying window 1 is assigned address 1, etc. The standard memory configuration, $\Delta$, is defined as that arrangement of data in memory such that datum d appears in window d, for $0 \leq d \leq N-1$, i.e., the initial memory configuration.

Data may be rearranged in memory in accordance with two different shuffle-type transformations, an Out Shuffle (O) and an In Shuffle (I). A datum at window p, for $0 \leq p \leq N-1$, is transferred to window O(p) for an Out Shuffle and to window I(p) for an In Shuffle, where O(p) and I(p) are defined as follows:

if N is even, $$O(p) = \begin{cases} 2p \pmod{N-1} & \text{for } p < N-1 \\ N-1 & \text{for } p = N-1, \end{cases} \quad (1)$$

and $$I(p) \equiv 2p+1 \pmod{N+1}; \quad (2)$$

if N is odd, $$O(p) \equiv 2p \pmod{N} \quad (3)$$

and $$I(p) \equiv 2p+1 \pmod{N}. \quad (4)$$

The symbol "≡" is used to denote congruence, modulo N, unless otherwise noted.

Figure 1:
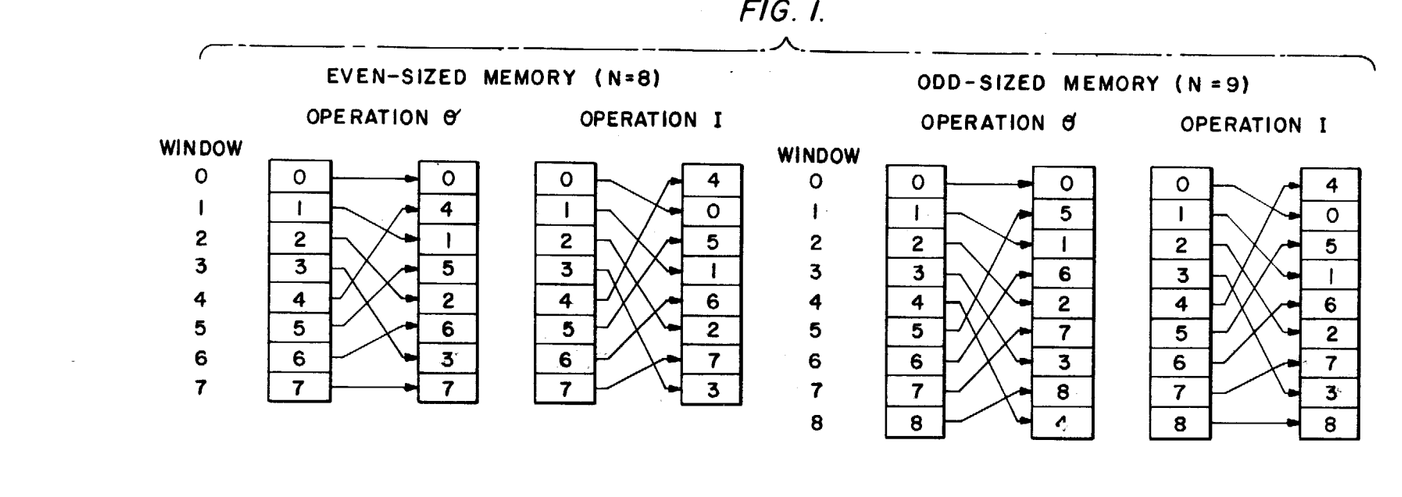
FIG. 1 is an illustration of the memory transformations resulting from the application of Out Shuffle (O) and In Shuffle (I) operations to both odd-sized and even-sized memories.

FIG. 1 illustrates the O and I operations on both even-sized and odd-sized memories. The Out Shuffle may be visualized as a data rearrangement similar to one in which a deck of cards is divided in half and then the two halves perfectly interleaved with the $0^{th}$ card on top. The In Shuffle is a similar interleaving except that the $0^{th}$ card goes into position 1. The Out Shuffle is the same as the previously described perfect shuffle. The In Shuffle however, is a more natural permutation than the exchange shuffle which has previously been employed in some memories.

From FIG. 1, it can be seen that an Out Shuffle operation leaves datum 0 in memory position 0, and in the case of N even, also leaves datum $N-1$ in position $N-1$. The In Shuffle however, rearranges the contents of each memory position, for N even, and leaves datum $N-1$ in position $N-1$ for N odd.

A memory configuration, $\alpha$, at any time, t, is an arrangement of data obtained by applying a t-long I-O sequence of operations to the standard memory configuration, $\Delta$. If the t shuffles are designated $S_1, S_2, \ldots, S_i, \ldots S_t$, where $S_i = O$ or I, then $\alpha = S_t S_{t-1} \ldots S_1 \Delta$.

The datum appearing in window k of the memory configuration, $\alpha$, is denoted by its address as $\alpha(k)$, for $0 \leq k \leq N-1$. The datum appearing in window k at time t is designated as $w_{k,t}$. Thus, if $\alpha$ is the memory configuration at time t, then $$w_{k,t} = \alpha(k), \text{ for } 0 \leq k \leq N-1.$$

At each unit of time, only one operation is performed, either O or I, and at $t=0$, the memory is assumed to be in the standard configuration. To determine how the memory configuration is changed for these operations, let $\alpha$ and $\beta$ be the memory configurations at times t and $t+1$ respectively. Then $\beta = S\alpha$, where $S = O$ or I, is the operation performed at time $t+1$. The datum at window k in configuration $\alpha$ is moved to window S(k) in configuration $\beta$. It may be demonstrated that $\alpha$ and $\beta$ are related in the following manner:

If $N=2m$, i.e., N even, then $$\beta(k) = \begin{cases} \alpha[mk \pmod{N-1}] & \text{for } S = O, k \neq N-1 \\ \alpha[N-1] & \text{for } S = O, k = N-1 \\ \alpha[(m+1)(k-1) \pmod{N+1}] & \text{for } S = I. \end{cases} \quad (5)$$

If $N=2m-1$, i.e., N odd, then $$\beta(k) = \begin{cases} \alpha[mk \pmod{N}] & \text{for } S = O \\ \alpha[m(k-1) \pmod{N}] & \text{for } S = I. \end{cases} \quad (6)$$

To illustrate, let $N=8$ (m=4) and apply the sequence of operations: O, I, O, O, I. The memory configuration after each operation is:

| Operation: | O | I | O | O | I |
|---|---|---|---|---|---|
| Window: | | | | | |
| 0 | 0 | 0 | 2 | 2 | 0 |
| 1 | 1 | 4 | 0 | 3 | 6 | 2 |
| 2 | 2 | 1 | 6 | 0 | 3 | 4 |
| 3 | 3 | 5 | 4 | 1 | 7 | 6 |
| 4 | 4 | 2 | 3 | 6 | 0 | 1 |
| 5 | 5 | 6 | 1 | 7 | 4 | 3 |
| 6 | 6 | 3 | 7 | 4 | 1 | 5 |
| 7 | 7 | 7 | 5 | 5 | 5 | 7 |
| Time: | 0 | 1 | 2 | 3 | 4 | 5 |

Starting with the standard memory configuration, at time $t=0$, $\alpha = \Delta$, equation (5) gives the configuration at time $t=1$. For example, the content of window $k=5$ at time $t=1$ is $$\beta(5) = \alpha[20 \pmod 7] = \alpha[6] = 6.$$

That is, the datum appearing in window 5 at time 1 as a result of an O operation, is the datum which previously appeared in window 6 at time 0. Similarly, the datum appearing in window 5 at time 2, as a result of an I operation on the memory configuration of time 1 is, from equation (5)

$$\beta(5) = \alpha[(4+1)(5-1)(\text{mod } 9)] = \alpha[2] = 1.$$

Random Accessing for Odd-Sized Memories

By use of only the previously defined I and O shuffle operations, it is possible to randomly access any desired datum, d, to the selected read/write window, j, in minimum theoretical time. This is seen to be $\Gamma_2(N)$ unit times, where a unit time is the time required for one memory rearrangement, $\Gamma_2(N)$ is defined to be the smallest integer such that $2^{\Gamma_2(N)} \geq N$. Hence, $$\Gamma_2(N) = \begin{cases} \log_2 N = r & \text{if } N = 2^r \\ [\log_2 N] + 1 & \text{otherwise.} \end{cases} \quad (7)$$

For example, if $N=7$, $\Gamma_2(7)=3$ since $2^3 \geq 7$ and any datum may be accessed in at most 3 unit times. Similarly, if $N=2^5=32$, $\Gamma_2(32)=5$ and any datum may be accessed in at most 5 unit times.

A method for determining the proper I-O sequence to randomly access any desired datum will now be described, for any odd-sized memory. The following notation will be used. Let the memory size be $N=2m-1$. Define $q=\Gamma_2(N)$ and $r=\exp_2 N$, where for N odd, $\exp_2 N$ is the power to which 2 belongs modulo N, i.e.

$$2^{\exp_2 N} \equiv 1 \; (\text{mod } N),$$

and $\exp_2 N$ is the least such positive integer with this property. Furthermore, if $\alpha$ is the memory configuration at time t and $w_{k,t}$ represents the contents of window k at time t, then it can be shown that $$\alpha(i) \equiv w_{k,t} + (i-k)m^t \text{ for } 0 \leq i > N, \quad (8)$$

where $\alpha(i)$ is the address of the datum appearing at window i at time t. Hence the entire memory configuration $\alpha$ is completely determined by $w_{k,t}$, which will be referred to as the memory state of $\alpha$. The window k is called the index window.

A method for determining the proper I-O sequence to randomly access any desired datum will now be described. Suppose in the memory configuration $\alpha$ with memory state $w_{k,t}$ an arbitrary datum, d, is to be accessed to an arbitrary window, j, in q units of time. It can be demonstrated that the memory configuration $\beta = S_q \ldots S_1 \alpha$ has datum d appearing in window j provided the q-long I-O sequence $S_1, \ldots, S_q$ is defined as follows: define $$x = 2^{q+1}(w_{k,t} - d) + 2^q a, \quad (9)$$

where $$a = (j-k)m^q - k \sum_{h=1}^{q} m^h. \quad (10)$$

Let the binary representation of x be given by $$x = \sum_{i=0}^{q-1} b_i 2^i, \quad (11)$$

and define $$S_i = \begin{cases} O \text{ if } b_{q-i} = 0 \\ I \text{ if } b_{q-i} = 1. \end{cases} \quad (12)$$

It should be noted that in equations (9) and (10), the only term related to the memory configuration $\alpha$ is the memory state $w_{k,t}$. Thus it is only necessary to keep track of $w_{k,t}$, the contents of the index window k at time t, in order to access any datum. To do this, one can show that the memory states at times t and t+1 are related by the following equation $$w_{k,t+1} = w_{k,t} - km^{t+1} - \delta(S)m^{t+1}, \quad (13)$$

where S is the shuffle performed at time t and $$\delta(S) = \begin{cases} 0 \text{ if } S = O \\ 1 \text{ if } S = I. \end{cases}$$

In equations (9) and (10), time t may be taken modulo r, since $r = \exp_2 N$ implies that $$(2^{-1})^r \equiv m^r \equiv 1 \; (\text{mod } N).$$

To illustrate, assume $N=9$ and $K=4$. Then $m=5$, $q=4$ and $r=6$. Assume further that the memory state at time $t=1$ is $w_{4,1}=3$ as illustrated below, and that it is desired to access datum $d=2$ to the read/write window $j=6$.

| | Operations: | O | O | O | I |
|---|---|---|---|---|---|
| | Window: | | | | |
| | 0 | 1 | 1 | 1 | 8 |
| | 1 | 6 | 8 | 0 | 5 | 1 |
| | 2 | 2 | 6 | 8 | 0 | 3 |
| | 3 | 7 | 4 | 7 | 4 | 5 |
| (k) | 4 | 3 | [2] | 6 | 8 | 7 |
| | 5 | 8 | 0 | 5 | 3 | 0 |
| (j) | 6 | 4 | 7 | 4 | 7 | [2] |
| | 7 | 0 | 5 | 3 | [2] | 4 |
| | 8 | 5 | 3 | [2] | 6 | 6 |
| $w_{4,t}$: | | 3 | 2 | 6 | 8 | 7 |
| t: | | 1 | 2 | 3 | 4 | 5 |

It can be seen that the I-O sequence O, O, O, I applied to the memory configuration at $t=1$, results in datum $d=2$ appearing in window 6 at $t=5$, as desired. Furthermore, this was accomplished with four operations, the minimum theoretical time, since $\Gamma_2(9)=4$, by equation (7).

This I-O sequence was derived from equations (9) and (10) as follows. Substituting the appropriate values gives $$2^{4+1}(3-2) + 2^4[(6-4)5^4 - 4(5+5^2+5^3+5^4)] = 5+5$$

and $$5+5\cdot1 = 0\cdot2^3 + 0\cdot2^3 + 0\cdot2^2 + 0\cdot2^1 + 1\cdot2^0$$

implying that $S_1=O$, $S_2=O$, $S_3=O$, O and $S_4=I$.

It should be noted that the flexibility of choosing the locations of the index window, k, and read/write window, j, can result in simplifications. For instance, it may be possible to access in fewer than q units of time if the contents of the read/write window are checked after each operation. This may be accomplished by setting k equal to j. If, in the above example, k and j were both selected to be at window 5, then datum $d=0$ could have been accessed in 1 unit of time rather than in 4 unit times.

Proper selection of j and k results in other simplifications, particularly in the hardware implementing the algorithm of equations (9) and (10). If k=0 and the read/write window in arbitrary, equation (10) becomes $$a = jm^t \tag{14}$$

and equation (9) can be shown to reduce to $$x = 2^{q+t} w_{0,t} - 2^{q+t} d + j. \tag{15}$$

Random Accessing for Memories of Size $2^r$

In the case of memories of a size equal to a power of 2, i.e. $N = 2^r$, $q = \Gamma_2(N) = r = \exp_2(N-1)$. As before, the memory configuration $a$ at time t is completely determined by $w_{k,t}$, the contents of window k at time t. In this case equation (8) becomes $$a(i) = w_{k,t} \oplus \rho^t(i \oplus k) \text{ for } 0 \leq i > N, \tag{16}$$

where $x \oplus y$ is the number whose binary coefficients are the component-wise MOD 2 addition of the binary coefficients of x and y, the symbol $\oplus$ representing MOD 2 addition, and $\rho^t(x)$ is the number whose binary coefficients are the r binary coefficients of x, end-around right-shifted t places.

To randomly access datum d to window j in q=r units of time, calculate $$x = \rho^{r-t}(d \oplus w_{k,t}) \oplus j \oplus k \tag{17}$$

and then define $S_1, \ldots, S_r$ using equations (11) and (12) as was done for the case of N odd.

Equation (17) is the generalized expression for the accessing algorithm for memories of size $N = 2^r$. As before, the only term related to the memory configuration is $w_{k,t}$, the memory state, which is the contents of index window k at time t. Knowledge of this term is sufficient to completely characterize the memory configuration and access any datum. Memory states at times t and t+1 are related by the equation $$w_{k,t+1} = w_{k,t} \oplus \rho^t(k) \oplus \rho^{t+1}(k) \oplus \delta(S) \rho^{t+1}(1), \tag{18}$$

where S is the shuffle performed at time t.

To illustrate the alogrithm, assume a memory of size N=8. Let the index window k=3 and assume that the memory has the configuration illustrated below at time t=0. Therefore, the memory state $w_{3,0} = 7$, which has the binary representation (111). Also, $r = \log_2 8 = 3$ and $q = \Gamma_2(8) = 3$, therefore any datum can be accessed in at most 3 unit times. Assume it is desired to access datum d=6=(110) to read/write window j=4=(100). Then from equation (17), $$x = \rho^{r-t}[d \oplus w_{k,t}] \oplus j \oplus k$$

$$= \rho^{3-0}[(110) \oplus (111)] \oplus (100) \oplus (011)$$

$$= (001) \oplus (111)$$

$$= (110)$$

which implies that $S_1 = I$, $S_2 = I$, and $S_3 = O$. That this is the correct sequence is seen from the last column in the following example. Datum d=6 appears at window 4 as desired.

| Window: | Operations: | I | I | O |
|---|---|---|---|---|
| (k)  (j) | 0 | 4 | 0 | 2 | 2 |
|  | 1 | 5 | 4 | 0 | 3 |
|  | 2 | [6] | 1 | [6] | 0 |
|  | 3 | 7 | 5 | 4 | 1 |
|  | 4 | 0 | 2 | 3 | [6] |
|  | 5 | 1 | [6] | 1 | 7 |
|  | 6 | 2 | 3 | 7 | 4 |
|  | 7 | 3 | 7 | 5 | 5 |
| $w_{3,t}$: | 7 = (111) | 5 = (101) | 4 = (100) | 1 = (001) |
| t (mod r): | 0 | 1 | 2 | 0 |

Thus, to randomly access any datum d in a memory of size $2^r$, MOD 2 add the binary representation of d to the binary address of the datum currently in the index window. Right-shift this binary number r−t places, where t is the time, taken MOD r. To the result, MOD 2 add the binary representation of the read/write window, j, and to this number, MOD 2 add the binary representation of the index window, k. The resulting binary number is the required sequence of operations to access the datum d, with 1 corresponding to an In Shuffle and 0 corresponding to an Out Shuffle.

Particularly significant is the fact that the read/write window may be selected to be any one of the N storage locations, not just the first such location. Similarly, the index window may be selected to be any desired window. Furthermore, the accessing algorithm can be simplified, resulting in a corresponding simplification of the hardware implementing it, by selecting the index and the read/write windows to be at the same location.

Sequential Accessing

Having randomly accessed a particular datum, d, in the manner described above, it is frequency desired to sequentially access successive data $d+1, \ldots, N-1$. Furthermore, it is desired to sequentially access these data in the minimum time. Under certain conditions, there exist processes for sequential accessing. Given that these processes exist, data $d+1, d+2, \ldots, N-1$ may be accessed in $(N-1)-(d+1)+1 = N-d-1$ units of time, using the I and O operations. The prerequisite for the existence of these processes is the existence of a tour, which may be defined as a sequence of N−1 operations which moves each element of a memory of size N, once and only once to some window.

Some properties of tours will be described hereinafter, as well as processes for determining their existence. However, in general it can be stated that the only known method of finding particular I-O sequences which are tours is to check exhaustively all possible I-O sequences at each window of the memory. Tours are a function of both memory size and memory window. For a given sized memory, tours may exist at some windows but not others. A given window may have more than one tour and in general, tours at one window are distinct from those which may exist at other windows, although as described hereinafter, in certain cases they may be related. Furthermore, for certain sized memories, tours may not exist at any window.

To illustrate, consider the following example of a memory of size N=8 (q=r=3) and j=k=4.

| Operations: | O | I | O | O | I | I | I |
|---|---|---|---|---|---|---|---|
| Window: | | | | | | | |
| 0 | 0 | 0 | 2 | 2 | 2 | 0 | 1 | 5 |

-continued

| | Operations: | O | I | O | O | I | I | I |
|---|---|---|---|---|---|---|---|---|
| | Window: | | | | | | | |
| | 1 | 1 | 4 | 0 | 3 | 6 | 2 | 0 | 1 |
| | 2 | 2 | 1 | 6 | 0 | 3 | 4 | 3 | 4 |
| | 3 | 3 | 5 | 4 | 1 | 7 | 6 | 2 | 0 |
| (j,k) | 4 | 4 | 2 | 3 | 6 | 0 | 1 | 5 | 7 |
| | 5 | 5 | 6 | 1 | 7 | 4 | 3 | 4 | 3 |
| | 6 | 6 | 3 | 7 | 4 | 1 | 5 | 7 | 6 |
| | 7 | 7 | 7 | 5 | 5 | 5 | 7 | 6 | 2 |
| | $w_{4,r}$: | 4 | 2 | 3 | 6 | 0 | 1 | 5 | 7 |
| | t: | 0 | 1 | 2 | 0 | 1 | 2 | 0 | 1 |

It is easily seen that the sequence O, I, O, O, I, I, I is a tour at window 4, since this sequence moves each datum to the window only once in $N-1=7$ operations. The read/write port can therefore be located at window 4. Notice that this sequence is also a tour at window 3. Locating the read/write port at any window other than 3 or 4 would not permit sequential accessing with this sequence. The complete tour structure for this memory is as follows:

| N = 8 | |
|---|---|
| TOUR | WINDOW(S) |
| OIOOIII | 3, 4 |
| OIIIOOI | 1, 6 |
| OIIIOII | 1, 6 |
| IOOIIIO | 3, 4 |
| IIOIIIO | 3, 4 |
| IIIOOIO | 1, 6 |

Notice that there are no tours at windows, 0, 2, 5 or 7 but there are three distinct tours for each of windows 3, 4 and 1, 6.

The sequential accessing process may be described using the above example. Since a tour on a memory of size N passes all data through the read/write port in exactly N steps, there exists a memory permutation associated with this tour, which may be used to define a mapping between external memory addresses and internal memory states. This mapping may be incorporated into an address decoder. Since window 4 in the above example was selected as the read/write port, the permutation associated with the tour illustrated is the sequence of data appearing in window 4. This permutation may be used to set up an address decoder having the following mapping of external addresses to memory states:

| External Address (e) → | [Internal Address ($w_4$), | Time (t)] |
|---|---|---|
| 0 | 4 | 0 |
| 1 | 2 | 1 |
| 2 | 3 | 2 |
| 3 | 6 | 0 |
| 4 | 0 | 1 |
| 5 | 1 | 2 |
| 6 | 5 | 0 |
| 7 | 7 | 1 |

A given external address, e, is thus mapped into the memory state $w_{4,t1}=(d, t_1)$. To sequentially access in unit time starting at external address e, some sequence of operations, e.g., O's, is performed to change the memory state to $(d',t_1)$ of index k. For example, if the current memory state is $w_{4,t0}$, perform $t_1=t_0$ (MOD r) Out Shuffles to change the memory state to the correct time, $t_1$, such that $w_{4,t1}=(d',t_1)$, where d' may be any datum.

The aforedescribed random accessing process is next used to move the desired datum, d, to the read/write port in r steps, obtaining the memory state $w_{4,t1}=(d, t_1)$ as desired. Application of the tour sequence beginning after $w_{4,t}$ for the number of data desired permits sequential accessing in unit time.

Continuing with the last example, assume that it desired to sequentially access data corresponding to external addresses 4, 5, 6 and 7. From above, this maps into internal addresses 0, 1, 5 and 7 and the starting memory state for datum 0 is $w_{4,t}=(0, 1)$. Assume further that the current memory state is $w_{4,t}=(0, 0)$ as illustrated by the first column of the following example.

| | Operations: | O | I | O | I | I | I | I |
|---|---|---|---|---|---|---|---|---|
| | Window: | | | | | | | |
| | 0 | 4 | 4 | 6 | 6 | 2 | 0 | 1 | 5 |
| | 1 | 5 | 0 | 4 | 7 | 6 | 2 | 0 | 1 |
| | 2 | 6 | 5 | 2 | 4 | 3 | 4 | 3 | 4 |
| | 3 | 7 | 1 | 0 | 5 | 7 | 6 | 2 | 0 |
| (j,k) | 4 | 0 | 6 | 7 | 2 | 0 | 1 | 5 | 7 |
| | 5 | 1 | 2 | 5 | 3 | 4 | 3 | 4 | 3 |
| | 6 | 2 | 7 | 3 | 0 | 1 | 5 | 7 | 6 |
| | 7 | 3 | 3 | 1 | 1 | 5 | 7 | 6 | 2 |
| | $w_4$,t: | 0 | 6 | 7 | 2 | 0 | 1 | 5 | 7 |
| | t: | 0 | 1 | 2 | 0 | 1 | 2 | 0 | 1 |

The first O is performed to change the memory state to the correct time, $t=1$. Then, datum O, corresponding to external address 4, is accessed with the three operations, I, O, I. The memory state is now $w_{4,t}=(0, 1)$ as required. Applying the operations corresponding to the appropriate part of the tour, i.e., I, I, I, data 1, 5 and 7 are accessed in unit time.

Properties of Tours

As previously described, the only known method of finding tours is to check exhaustively all possible I-O sequences at each window of the memory. For memories of any practical size, this is a very time-consuming and expensive process. Certain properties of tours have been discovered, however, which can substantially reduce the number of windows which must be checked. These will be stated without proofs.

(i) For N even, a tour at window j is a tour at window N-1-j. For N odd, a tour at window j is the complement of a tour at window N-1-j, i.e., interchanging O and I in a tour at window j results in a tour at window N-1-j. For any sized memory, the number of tours at window j is equal to the number of tours at window N-1-j. These properties permit the number of windows which must be checked for tours to be cut in half, i.e., if N=64, it is only necessary to examine windows 0–31 for tours.

(ii) For $N=2^r$, if $b(j)=(j_{r-1}, \ldots, j_1, j_0)$ is the binary representation of j, and $b[U(j)]=(j_0, \ldots, j_{r-2}, j_{r-1})$ is the reverse of the binary representation of j, then the reverse of a tour at window b(j) is a tour at window b[U(j)]. To illustrate, the sequence, O, I, I, I, O, O, I is a tour at window 1=(001). Therefore I, O, O, I, I, I, O is a tour at window 4=(100).

(iii) Since an Out Shuffle fixes the datum in window 0, the only possible tour at window 0 is a sequence of all I's. This is a tour, if N is even and $exp_2(N+1)=N$. Furthermore, if the sequence of all I's is a tour at window 0, then it is a tour at all windows. For $N=2^r$ there are no tours at window 0 if N is greater than 4.

(iv) If N is odd and $\exp_2(N)=N-1$, then the sequence I, I, ... I, O is a tour at window 1.

(v) For $N=2^r$, $0 \leq k \leq N-1$, and $b(k)=(k_{r-1}, \ldots, k_0)$, define d as the density of 1's in $b(k)$, $d_B(h)$ as the density of 1's in the beginning r−h bits $(k_{r-1}, \ldots, k_h)$, and $d_E(h)$ as the density of 1's in the remaining h bits $(k_{h-1}, \ldots, k_0)$. Then a necessary condition for a tour to exist at window k is that for every j, $0 \leq j \leq r-1$, there exists an integer x such that one of the following equation holds:

$$(2d-r)x = 2^{r-1} - [s(r-d) + d_B(j) + d_E(m)] \quad (20)$$

or $$(2d-r)x = 2^{r-1} - [s(r-d) + d_B(j) + m - d_E(m)] \quad (20)$$

where m and s are determined by $$N-(r-j) = sr + m, \ 0 \leq m \leq r-1. \quad (21)$$

Application of the above properties to a memory of size $N=2^6=64$, it is found that only windows 3, 12, 21, 22 and 25 need be checked for tours. Exhaustive computer testing of these five windows revealed only one tour. This was at window 22. This tour is:

IOOOO IOOOI IIOOO IOIII OOIIO IIOIO OIOIO IIOOI OIOOI IIIOO IIOIO OIOIO III.

By virtue of (i) and (ii) supra, this is also a tour at window 41 and the reverse sequence is a tour at windows 26 and 37.

Similarly, for N=128, the complete tour structure can be determined by examining nineteen windows. These are:

7, 11, 13, 14, 19, 21, 22, 25, 26, 28 29, 30, 37, 38, 41, 42, 46, 49 and 54.

Detailed Description of Preferred Embodiment

Figure 2:
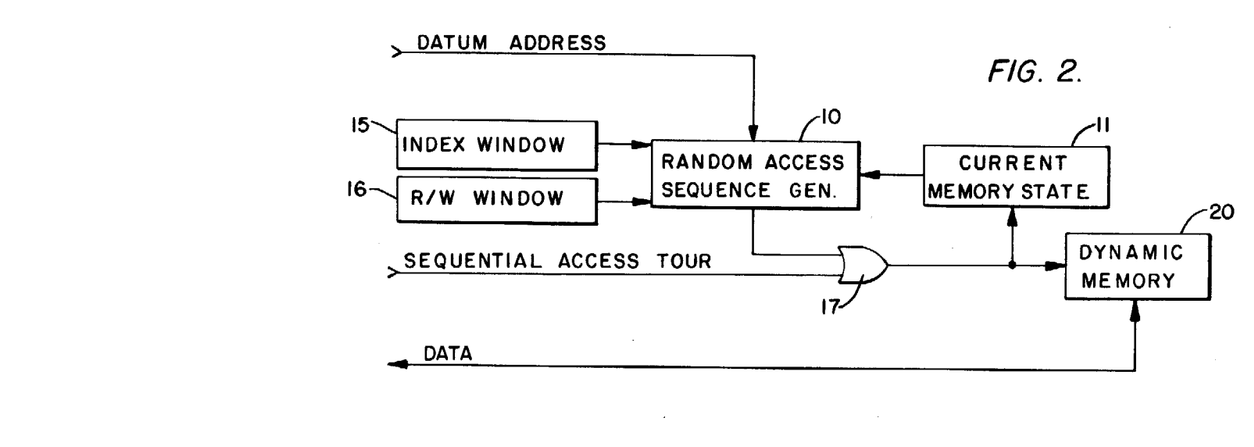
FIG. 2 is a generalized block diagram of a memory system employing the principles of the invention.

A generalized block diagram of a memory system embodying the principles of the invention is illustrated in FIG. 2. To randomly access any desired datum, the datum address in the form of a multi-bit binary number is input to a random access sequence generator, 10, along with the current memory state, 11, and the locations of the index window, 15, and the read/write window, 16, of the memory. Random access generator 10 includes control circuits and embodies the appropriate algorithm defined by either equations (9) and (10) for odd-sized memories or equation (17) for memories of a size equal to a power of 2. Random access sequence generator 10 generates the required sequence of In Shuffles and Out Shuffles to access the desired datum to the designated read/write window 16 of the memory. This I-O sequence is applied through OR-gate 17 to dynamic memory 20 which employs the previously defined In Shuffle and Out Shuffle interconnections among its stages. The I-O sequence is also fed to current memory state generator 11 which keeps track of the datum address appearing in the designated index window 15. Data may be sequentially accessed by supplying the appropriate tour sequence through OR-gate 17 to memory 20.

Figure 3:
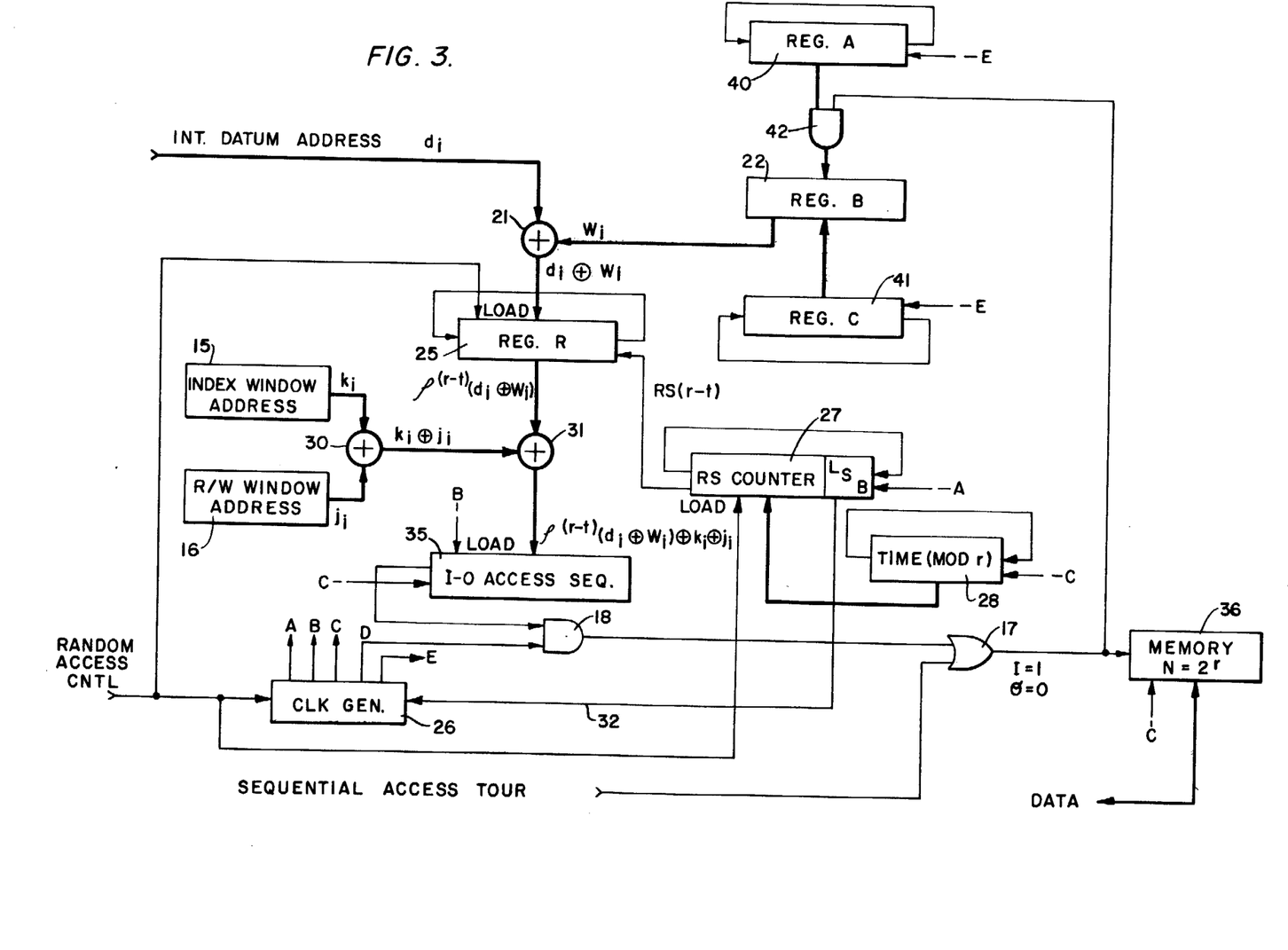
FIG. 3 is a block diagram of the control circuits for generating an I-O random accessing sequence in a memory of size $N=2^r$.

FIG. 3 is a detailed block diagram illustrating the control circuits for a memory system of size $N=2^r$. The control circuits embody the accessing process defined by equation (17). To randomly access a desired datum, a random access control signal is applied to the memory system along with the multi-bit binary address of the desired datum. The binary bits, $d_i$, of the datum address are input in parallel to MOD 2 adder 21, which forms the bit-by-bit MOD 2 sum of the input datum address and the datum address of the current datum appearing in the index window of the memory, which is stored in register B, 22. For purposes of illustration, only a single MOD 2 adder, 21, is illustrated in FIG. 3 and parallel lines are represented by bold lines. It should be understood, however, that each bit of the datum address is input via a separate line to a separate MOD 2 adder.

The random access control signal causes the output of MOD 2 adder 21 to be loaded into Register R, 25. The random access control signal is also used to initialize clock generator 26, which generates clock and control signals for the memory system and RS Counter 27 which is used to right-shift Register R by r-t positions. Upon initialization, RS Counter 27 is cleared and loaded with the current time stored in Time register 28.

Both RS Counter 27 and Time register 28 are r-stage, end-around left-shift registers. Time register 28 contains a single circulating bit, a logic 1. Each time a basic system clock pulse, C, from clock generator 26 occurs, the circulating bit in Time register 28 is shifted one position to the left, end-around. The position of this bit in Time register 28 indicates the time, modulo r.

When the random access control signal appears, RS Counter 27 is cleared and a single bit is loaded into RS Counter 27 in the same position as the circulating bit in Time register 28. This action updates RS Counter 27 with the current time, T (MOD r).

Clock generator 26, initialized by the random access control signal, generates A-clock pulses, which are input to the shift control of RS Counter 27. Each A-clock pulse shifts the single bit in RS Counter 27 one position to the left, end-around, in exactly the same manner as the Time register, 28, is shifted. The rate of the A-clock pulses is r times the rate of the basic system clock pulses, C. RS Counter 27 further outputs these A-clock pulses to Register R as shift pulses, which cause the contents of Register R to be end-around, right-shifted by r-t positions, where t is the current time taken MOD r. This causes the MOD 2 sum of the datum address and the index datum stored in Register R to be right-shifted r-t places.

The binary representation of the locations of the index window, k, stored in register 15 and the read/write window, j stored in register 16, are MOD 2 added bit-by-bit in MOD 2 adder 30. The resulting binary word is then MOD 2 added bit-by-bit with the right-shifted contents of Register R in MOD 2 adder 31. When the circulating 1 in RS Counter 27 reaches the least significant bit (LSB) position it is detected by an LSB detector and a signal is fed via line 32 to clock generator 26. This causes the A-pulses to cease and a single B-pulse to be generated by clock generator 26. This B-pulse causes the output from MOD 2 adder 31 to be loaded into register 35. The sequences of 1's and 0's which constitute the binary word stored in register 35 is the I-O sequence required to access the desired datum to the designated read/write window of memory 36, as defined by equation (17).

Clock generator 26 then generates r D-clock pulses to AND-gate 18 and register 35, which shift the I-O sequence out through OR-gate 17 to memory 36. Each bit of the binary sequence stored in register 35 causes the contents of memory 36 to be rearranged in accordance with either an In Shuffle or an Out Shuffle operation depending upon its value, with a 1 corresponding to an In Shuffle and a 0 corresponding to an Out Shuffle.

Memory 36 may be an N stage shift register memory, for example, having In Shuffle and Out Shuffle interconnections between its stages, as defined by equations (1) and (2). Simultaneously with the generation of D-clock pulses, clock generator 26 generates C-clock pulses which are the basic system clock pulses, fed to memory 36 and Time register 28. The C-clock pulses cause the contents of memory 36 to be either In Shuffled or Out Shuffled depending upon the value of corresponding bits of the access sequence. Memory 36 is illustrated in more detail in FIG. 5.

If at the time a datum address is input to MOD 2 adder 21 and the random access control signal initializes clock generator 26, the circulating 1 in time register 28 is already in the least significant bit position, i.e., $t=0$, it is unnecessary to right-shift the contents of Register R, since a right-shift of $r-0$ is equivalent to a right-shift of 0 places. In this case, when a 1 is loaded into the LSB position of RS Counter 27, a B pulse would be generated immediately causing the output of MOD 2 adder 31 to be loaded into register 35.

The binary representations of the locations of the index and the read/write windows may be stored in fixed registers 15 and 16, respectively. However, since the location of the index and read/write windows are normally fixed in advance, registers 15 and 16, as well as MOD 2 adder 30, may be replaced by a single register containing the bit-by-bit MOD 2 sum of j and k. Furthermore, if the index and read/write windows are selected at the same location, their MOD 2 sum will equal 0. In this case, registers 15 and 16 and MOD 2 adders 30 and 31 may be eliminated, since the MOD 2 addition of the contents of Register R with 0 is simply equal to the contents of Register R. This permits simplification of the control circuitry.

The binary address, $w_i$, of the datum currently appearing in the index window, is stored in Register B, 22, as previously mentioned. Each time the contents of memory 36 are shuffled, Register B is updated with the new index datum address in accordance with equation (18). This is accomplished using two r-stage, end-around, right-shift registers, Register A, 40, and Register C, 41, and AND-gate 42. The content of Register A is $\rho^{t+1}(1)$, where $\rho^t(1)$ represents the right-shift by t positions of the binary representation of 1. The content of Register C is $\rho^t(k) + \rho^{t+1}(k)$ where $\rho^t(k)$ represents a right-shift by t positions of the binary representation of k, the index window. Register B's content is $$\rho^t(k) + \sum_{i=1}^{t} \delta(S_i)\, \rho^i(1),$$

where $$\delta(S_i) = \begin{cases} 0, \text{ of } S_i = O \\ 1, \text{ if } S_i = I. \end{cases}$$

When a shuffle is performed, the contents of Register C are MOD 2 added bit-by-bit to the contents of register B and the contents stored in Register B. If the shuffle is an Out Shuffle, this is the new index datum address. If the shuffle is an In Shuffle, however, the contents of Register A are also MOD 2 added to (B⊕C) and the result, which is the new index datum address, stored in Register B. Registers A and C are then both right-shifted one position by clock pulses E from clock generator 26 in preparation for the next shuffle. The E-clock pulses are generated at the same rate as the C-clock pulses, but offset in time by an amount to permit the requisite MOD 2 operations on the contents of registers A, B and C to be completed.

Figure 4:
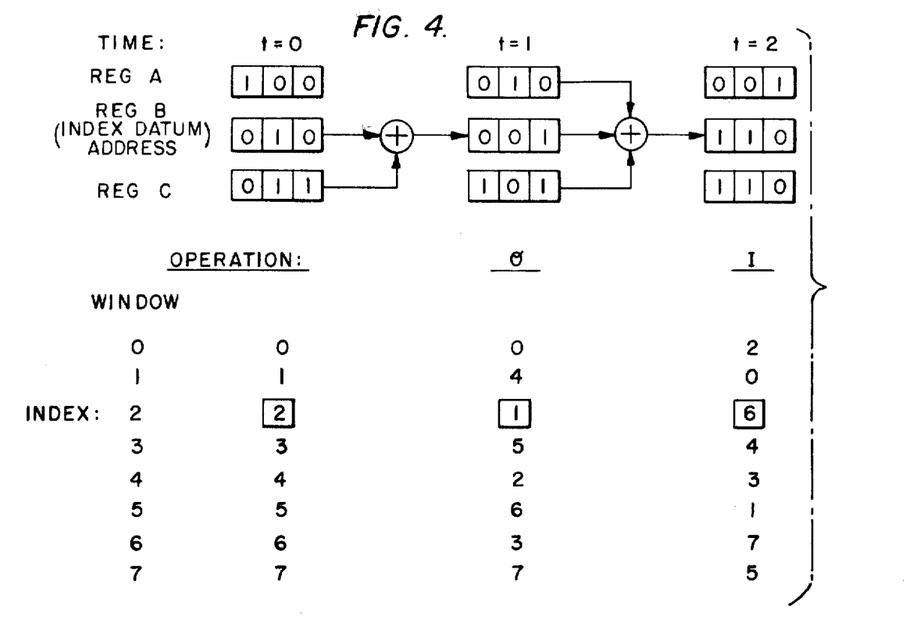
FIG. 4 illustrates the manner in which a portion of the control circuit of FIG. 3 functions to maintain knowledge of the current memory state.

The operation of registers A, B and C in keeping track of the current index datum is illustrated in FIG. 4 for a memory of size $N=8$. In this case, $r=3$. Initially, at $t=0$ Register A is loaded with a right-shifted 1 to produce (100). Register B is loaded with the binary representation of k, which is assumed to be 2 in this case or (010). Register C is loaded with the binary representation of k MOD 2 added to the binary representation of k shifted by one place or (011).

If at time $t=1$ an Out Shuffle occurs, the new memory configuration will be as illustrated in FIG. 4 with datum 1 shifted to the index window. MOD 2 adding the contents of registers B and C at $t=0$, produces (001) at $t=1$, which is the new index datum. The contents of registers A and C are then shifted one position to the right by clock pulses E such that their contents become (010) and (101), respectively, as illustrated. At time $t=2$, if an In Shuffle occurs, the memory configuration will be as illustrated in the last column of FIG. 4. A logic 1 appearing on the output of OR-gate 17 enables AND-gate 42 so that the contents of Register A at $t=1$ are MOD 2 added bit-by-bit to the MOD 2 sum of registers B and C to produce (110), which is the new index datum at $t=2$. Registers A and C are again shifted one position to the right by clock pulses E in preparation for the next shuffle. This process is repeated for each shuffle such that the contents of Register B are always the current index datum.

With the desired datum having been randomly accessed, successive data may be sequentially accessed by supplying the appropriate tour sequence to OR-gate 17 as previously described. This is accomplished by applying the tour sequence to OR-gate 17, in synchrony with the C-pulses.

Figure 5:
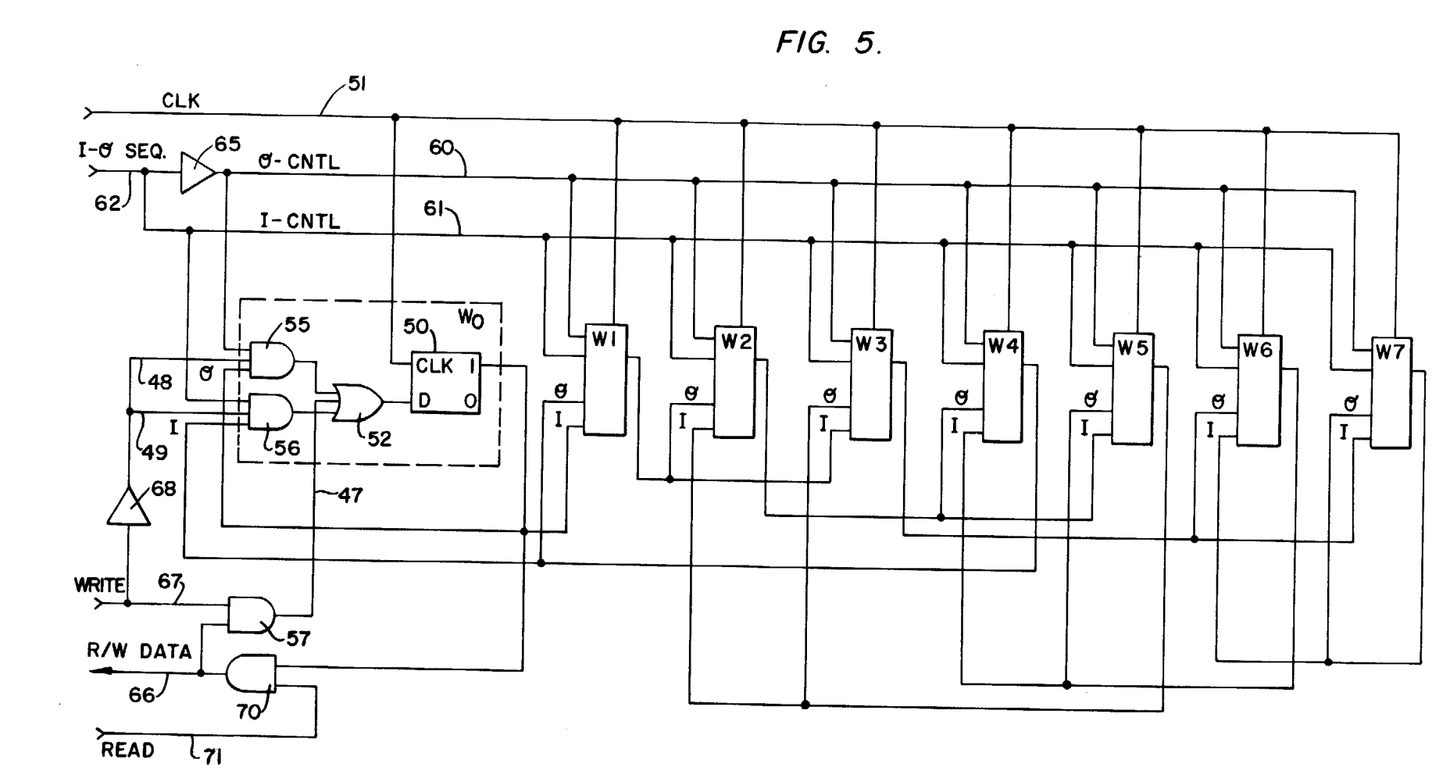
FIG. 5 is an illustration of a shift register memory employing O and I interconnections among the various memory stages.

A shift register memory suitable for implementing memory 36 is shown in FIG. 5. The memory illustrated comprises $N=8=2^3$ register stages for the storage of data, although any convenient number of storage locations may be provided. The storage locations of the memory are labeled W0–W7. Since each of the shift register stages W0 through W7 are identical, with the exception of the input line 47 to OR-gate 52, line 48 to AND-gate 55, and line 49 to AND-gate 56, only the details of stage W0 are illustrated in FIG. 5.

Each shift register stage includes a D-type flip-flop, 50, having a clock input labeled CLK, a data input labeled D and an output labeled 1. A positive going pulse on the clock input to flip-flop 50, results in the value of the data bit at input D appearing at output 1. Clock pulses are input to each flip-flop of stages W0–W7 simultaneously from clock line 51. The clock pulses on line 51 are the C-pulses from clock generator 26. The D input to flip-flop 50 is derived from OR-gate 52, which is supplied with inputs from AND-gates 55 and 56, and in the case of W0, with a data input from AND-gate 57 via line 47.

AND-gates 55 and 56 each have one of their inputs connected to either Out Shuffle control line 60 or In Shuffle control line 61. A second input to each of AND-gates 55 and 56 is connected to the output from different ones of stages W0–W7. These second inputs, labeled I and O, provide inputs to flip-flop 50 through OR-gate 52 and either AND-gate 55 or AND-gate 56, depending upon whether an Out Shuffle or an In Shuffle memory transformation is to be performed. Inputs O and I are connected to the output of an appropriate stage W0-W7, as defined by equations (1) and (2), such that upon the appearace of a clock pulse on line 51, the contents of the shift register stages are rearranged in accordance with either an Out Shuffle or In Shuffle operation, depending upon the value of the bit of the I-O suspense appearing on line 62 at the time the clock pulse appears. The appropriate input, O or I, is selected by enabling AND-gate 55 or AND-gate 56 with a logic 1 on either control line 60 or 61.

As previously described, the I-O suspense on line 62, is a sequence of 1's and 0's, with a 1 corresponding to an In Shuffle and a 0 corresponding to an Out Shuffle. If at the time a clock pulse appears on line 51, the corresponding I-O sequence bit on line 62 is a 1, corresponding to an In Shuffle, a 1 will appear on I-CNTL line 61, enabling AND-gate 56 so that input I is fed through OR-gate 52 to input D of flip-flop 50. Since input I of W0 is connected to the output of W4, the data bit previously stored in W4 is transferred to W1. Conversely, if the value of the bit on line 62 is a 0, corresponding to an Out Shuffle, a 0 will appear on I-CNTL line 61. However, inverter amplifier 65 inverts this bit so that a one will appear on O-CNTL line 60. This enables AND-gate 55 which connects input O to the D input of flip-flop 50. Input O is connected to the output of W0 so that the data bit previously stored in W0 is input back into flip-flop 50, as required by equation (1).

The remaining stages W1-W7, similarly have O and I interconnections to the appropriate stages W0-W7, as defined by equations (1) and (2). Each clock pulse causes the data in each of stages W0-W7 to be rearranged simultaneously in accordance with either an Out Shuffle or an In Shuffle operation, depending upon the corresponding value of the I-O sequence bit appearing on line 62. Consequently, a complete memory transformation occurs for each clock pulse.

The third input 47, to OR-gate 52, is used to write into memory external data input on the read/write data line 66. A logic 1 control signal on write line 67 enables AND-gate 57 so that the data is input to OR-gate 52 and flip-flop 50. A logic 1 on write line 67 also appears as a logic 0 at the output of inverter 68, which disables AND gates 55 and 56, via the control lines 48 and 49, when data is being written into the memory. These inputs 47, 48 and 49, are only necessary on the shift register stage selected as the read/write window and thus are not used on W1-W7. Data may be written into memory through read/write window W0, by enabling AND-gate 57 with a write control signal on line 67 and shifting the data in on read/write line 66 by applying an I-O tour sequence to line 62.

Data previously stored in memory is read over read/write data line 66, connected to the selected read/write window W0, through AND-gate 70. Reading is accomplished by enabling AND-gate 70 with a logic 1 read control signal on line 71.

Figure 6:
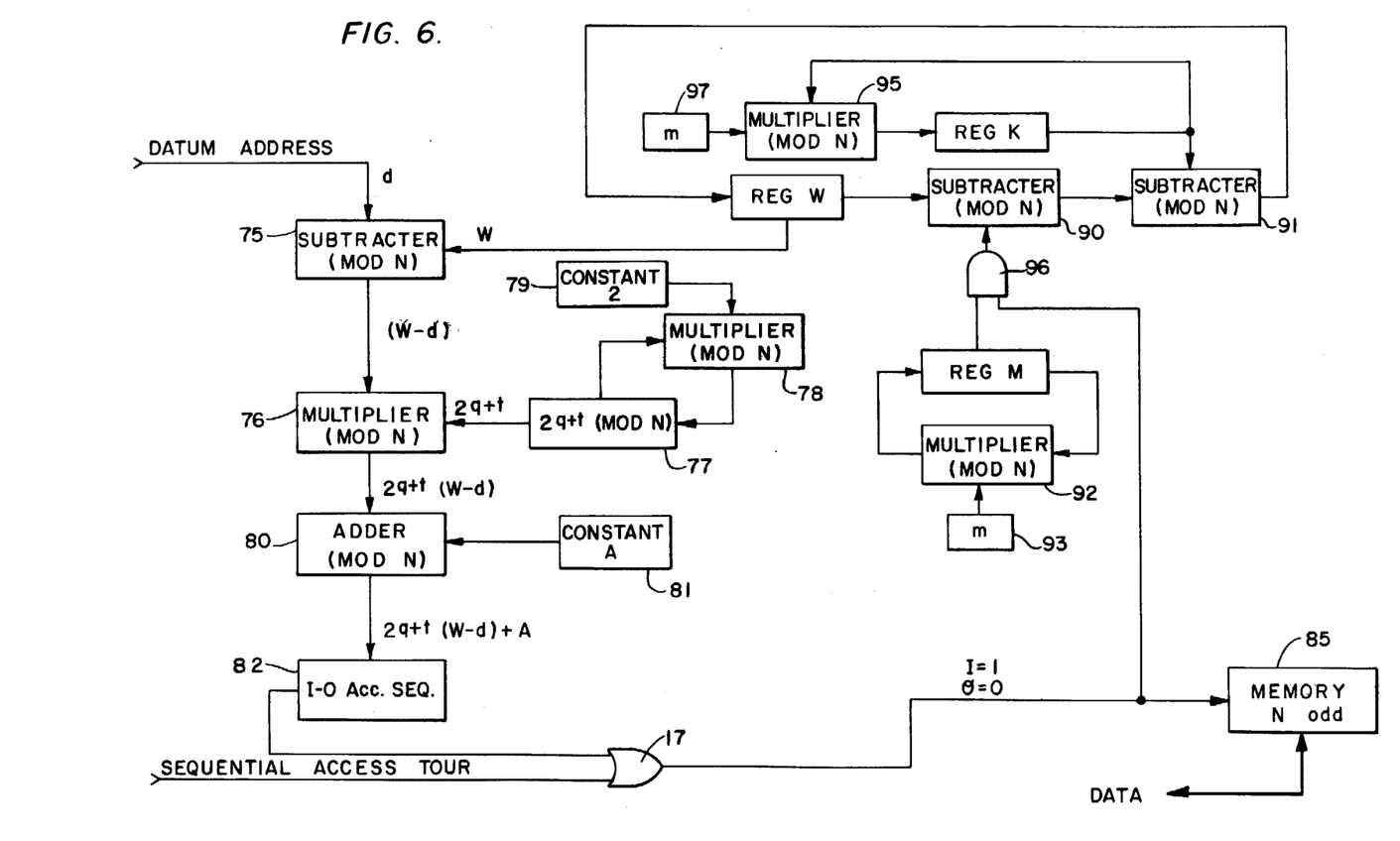
FIG. 6 is a functional block diagram of an odd-sized memory system.

FIG. 6 is a functional block diagram of an odd-sized memory system, illustrating the control circuits which generate the I-O access sequence for randomly accessing any desired datum. The control circuits, illustrated functionally in FIG. 6, implement the process defined by equations (9) and (10), to calculate the proper I-O sequence to access in q operations, a desired datum to the read/write window of memory 85. The binary representation of the desired datum, d, is input into a binary subtractor 75, where d is subtracted modulo N from the binary representation of w, the current index datum address stored in register W. The output of subtractor 75 is multiplied, modulo N, in binary multiplier 76, by $2^{q+t}$ from register 77. At t=0, register 77 is initialized with the value $2^q$. Thereafter, the contents of register 77 are multiplied MOD N in multiplier 78 by the constant 2 stored in register 79, for each clock pulse, and the result stored back in register 77. Therefore, register 77 contains the quantity $2^{q+t}$ (MOD N).

Binary adder 80 then adds modulo N to the output of multiplier 76, a constant term A, stored in register 81. The constant $A=2^q a$, where a is given by equation (10). The output binary word of adder 80 is the q-long I-O access sequence for the datum d, which sequence is stored in the I-O access sequence register 82. The I-O sequence stored in 82 may be clocked out through OR-gate 17 to memory 85, in the same manner as illustrated in FIG. 3.

The contents of register W are updated with each shuffle operation in order to keep track of the address of the datum appearing in the selected index window, k. This is accomplished utilizing registers W, K, and M, binary modulo N subtracters 90 and 91, binary multipliers 92 and 95 and AND-gate 96, as illustrated in FIG. 6. The circuit formed by these elements implements the process defined by equation (13).

Each of the registers W, K and M are q-stages long. Initially, at t=0, register W is loaded with the binary address of the datum appearing in index window k. Register M is loaded with the value of m, where $N=2m-1$, and Register K is loaded with the value of km, where k is the selected index window.

For each shuffle operation, the contents of Register M are multiplied, modulo N, by the constant m stored in register 93 in multiplier 92 and the result is reinserted in Register M. The contents of register K are similarly multiplied, modulo N, by the constant m stored in register 97 in multiplier 95 and the result stored in Register K. Thus, at any time t, the contents of Register M are $m^{t+1}$(MOD N) and the contents of Register K are $km^{t+1}$(MOD N). To update the contents of Register W, if an In Shuffle is performed, AND-gate 96 is enabled so that the current contents of Register M are subtracted from the contents of Register K in subtracter 90. From this number, the contents of register K are subtracted modulo N in subtracter 91 and the result is stored in Register W. This is the address of the new datum appearing in the selected index window of the memory, as a result of performing an In Shuffle. If, however, an Out Shuffle operation is performed, AND-gate 96 is not enabled so that 0 is subtracted from the contents of Register W in subtracter 90, prior to being input into subtracter 91.

The binary modulo N multipliers, adders and subtracters illustrated in FIG. 6 may be implemented in a variety of ways known to those skilled in the art. For example, George K. Kostopoulos, "Digital Engineering," John Wiley and Sons, New York, 1975, illustrates a number of ways of implementing these functions using discrete logic components.

If the memory size is selected to be $N=2^r-1$, and the read/write window, j, and the index window, k, are selected to be at the same location, a significant hardware simplification results. If j=k, the first term in equation (10) is zero. Furthermore, if $N=2^r-1$, $q=r$ and the second term in equation (10) is congruent to zero, MOD N. Therefore, a=0 and the second term of equation (9) drops out. This permits adder 80 and register 81 to be eliminated. Furthermore, the remaining logic elements can be simplified using 1's complement arithmetic logic elements.

Figure 7:
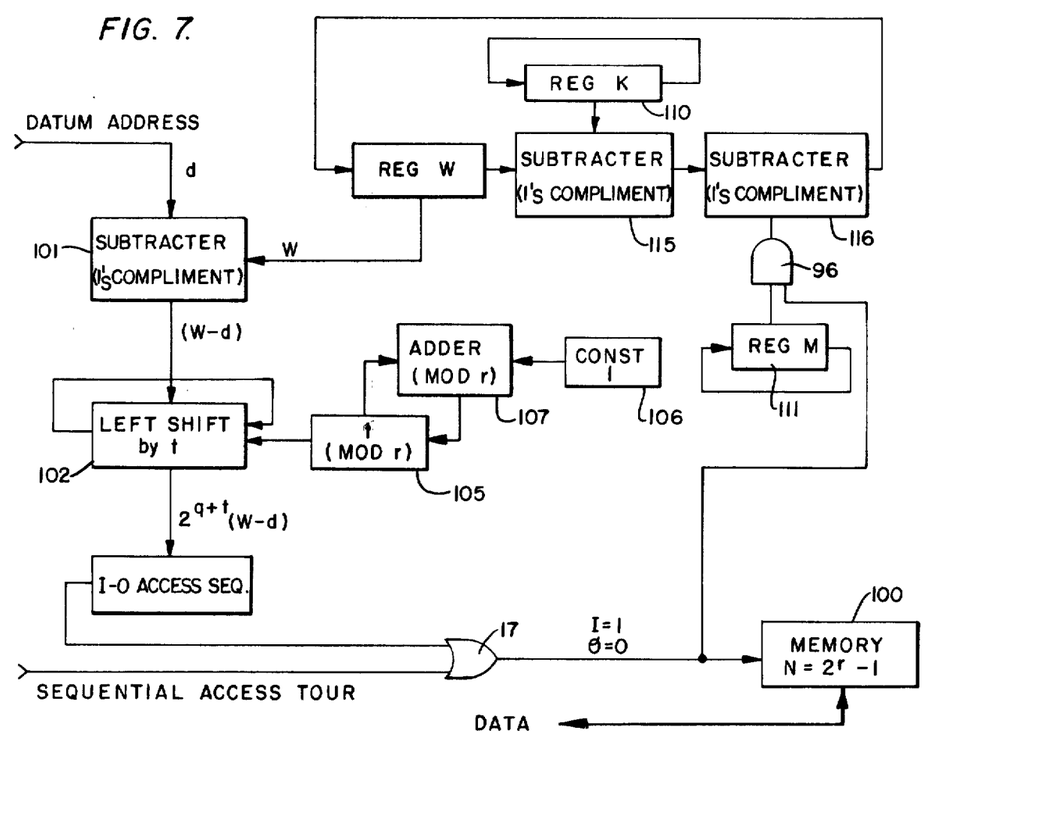
FIG. 7 is a functional block diagram of the memory system of FIG. 6 with $N=2^r-1$, and $j=k$.

FIG. 7 illustrates a system having a memory, 100, of size $N=2^r-1$ and $j=k$, employing simplified logic. The input datum address, d, is subtracted from the address of the current index datum, w, in a 1's complement logic subtracter, 101. In 1's complement arithmetic, this is accomplished by complementing the bits of d and adding them to the bits of w. Since $q=r$ and $2^q=1$ (MOD N), $2^{q+t}=2^t$, by equation (9), the output (w-d) of subtracter 101 must be multiplied by $2^t$. This can be easily accomplished by left-shifting, end-around, the quantity (w-d) by t positions. Therefore, the output of subtracter 101 is input to end-around, left-shift register 102. The output of register 102, the required I-O accessing sequence for datum d, is then loaded into q-long register 82, from which it is output through OR-gate 17 to memory 100.

To shift register 102 by t positions, use is made of registers 105, 106 and MOD r adder 107. Register 105 is an r-stage register which keeps track of time MOD r. Each clock pulse causes the current time in register 105 to be added in MOD r adder 107 to the constant 1 stored in register 106.

The control circuits implementing equation (13) which keep track of the current index datum are also simplified in the memory of FIG. 7.

Register K which contains the term $km^{t+1}$ may be implemented by an end-around, right-shift register 110, which is initialized with the value of k, right-shifted one position. Each subsequent shuffle causes the contents of register 110 to be shifted one position to the right.

Similarly, Register M which contains the term $m^{t+1}$ may be an end-around, right-shift register 111, initialized with a 1 in the most significant bit position and thereafter shifted one position for each shuffle.

To maintain the current address of the index datum in Register W, the contents of Register K are subtracted from the contents of Register W in 1's complement subtracter 115, with each shuffle. If an I Shuffle were performed, AND-gate 96 is enabled and the contents of Register M are subtracted from the output of subtracter 115 in 1's complement subtractor 116. This result, the current index datum address, is then stored in Register W. If instead of an I Shuffle, an O Shuffle is performed, a zero is subtracted from the output of subtracter 115 in subtracter 116 and the result stored in Register W.

One's complement subtracters 115 and 116 may be implemented in the same manner as previously described for subtractor 101. MOD r adder 107 may be implemented in the same manner as the adders of FIG. 6.

While the foregoing description has been with reference to selected embodiments, it will be appreciated by those skilled in the art that numerous variations are possible. It is intended that the invention be limited only by the appended claims.

What is claimed is:
1. A memory system comprising:
   a dynamic memory having N locations, $0, \ldots, N-1$, for the storage of data, wherein N is any odd number or any integer power of 2;
   first and second interconnections among said storage locations such that the data in said memory may be rearranged in accordance with first and second shuffle operations, wherein said first shuffle operation is an In Shuffle and said second shuffle is an Out Shuffle; and
   control means connected to said first and second interconnections and responsive to the input address of a desired datum for generating control signals defining a sequence of said shuffle operations, said control signals enabling said first and second interconnections such that said dynamic memory is reconfigured in accordance with said shuffle operations to access said datum to a preselected memory location.

2. The memory system of claim 1 wherein said preselected memory location is the read/write window, j, of said memory, for writing data into and reading data from said memory and where j may be selected such that $0 \leq j \leq N-1$.

3. The memory system of claim 2 wherein said control means further includes means for determining the address of the datum located in a preselected index storage location, k, of said memory, where k may be selected such that $0 \leq k \leq N-1$.

4. The memory system of claim 3 wherein the memory configuration at time t is completely specified by the memory state, $w_{k,t}$, wherein $w_{k,t}$ is said address of the datum appearing in said index location, k, at time t, thereby permitting the address of the datum in each memory location to be determined.

5. The memory system of claim 4 wherein said determining means further includes means for determining the current memory state after each shuffle operation.

6. The memory system of claim 5 wherein said control means further comprises means responsive to said memory state determining means such that for a preselected j, k, and N, said sequence of shuffle operations is uniquely determined by the address of said desired datum, d, and said current memeory state, $w_{k,t}$.

7. The memory system of claim 6 wherein said sequence of shuffle operations has a maximum length of $\Gamma_2(N)$, where $\Gamma_2(N)$ is the smallest integer such that $2^{\Gamma_2(N)} \geq N$, thereby permitting said datum to be accessed in the minimum theoretical time, $\Gamma_2(N)$ unit times, wherein a unit time is the time required for one shuffle operation to be performed.

8. The memory system of claim 7 further comprising means for sequentially accessing successive data, $d+1, d+2, \ldots, N-1$, to said location j, by application of a predetermined tour sequence to said memory, such that each successive datum is accessed in unit time.

9. The memory system of claim 1 wherein said dynamic memory is a shift register.

10. The memory system of claim 8 wherein said memory size is $N=2^4$, where r is a positive integer.

11. The memory system of claim 10 wherein said memory configuration at time t is specified by the memory state, $w_{k,t}$, in accordance with the relationship $$a(i) = w_{k,t} \oplus p^t(i \oplus k),$$

where $a(i)$ is the address of the datum in location i at time t.

12. The memory system of claim 10 wherein said control means includes means for generating said sequence of shuffle operations in accordance with the relationship $$x = p^{t-1}(d \oplus w_{k,t}) \oplus j \oplus k.$$

where the values of the bits of the binary number x define said sequence of shuffle operations, wherein a binary 1 corresponds to an In Shuffle and a binary 0 corresponds to an Out Shuffle.

13. The memory system of claim 8 wherein said memory size is $N=2m-1$, where m is any positive integer.

14. The memory system of claim 13 wherein said memory configuration at time t is specified by the memory state, $w_{k,t}$, in accordance with the relationship $$a(i) = w_{k,t} + (i-k)m^t,$$

where $a(i)$ is the address of the datum in location i at time t.

15. The memory system of claim 14 wherein said control means includes means for generating said sequence of shuffle operations in accordance with the relationship $$x = 2^{q+t}(w_{k,t}-d) + 2^q a,$$

where $$a = (j-k)m^q - k \sum_{h=1}^{q} m^h,$$

and $$q = \Gamma_2(N),$$

wherein the value of the bits of the binary representation of x define said sequence of shuffle operations, wherein a binary 1 corresponds to an In Shuffle and a binary 0 corresponds to an Out Shuffle.

16. In a dynamic memory having N locations, $0, \ldots, N-1$, for the storage of data, a method of accessing a desired datum, comprising the steps of:

selecting a storage location, j, $0 \leq j \leq N-1$, to which said datum is to be accessed;

determining the address, $w_{k,t}$, of the datum currently existing in a preselected index location, k, $0 \leq k \leq N-1$, where t is the current time;

generating a sequence of In Shuffle and Out Shuffle operations dependent upon $w_{k,t}$ and d, the address of the desired datum to be accessed; and applying said sequence of In Shuffle and Out Shuffle operations to said memory such that the data contents of said memory locations are arranged in accordance with said shuffle operations to move datum d to location j.

17. The method of claim 16 wherein said sequence of shuffle operations has a maximum length, of $\Gamma_2(N)$, where $\Gamma_2(N)$ is the smallest integer such that $2^{\Gamma_2(N)} \geq N$.

18. The method of claim 17 further comprising the step of sequential accessing successive data $d+1, d+2, \ldots, N-1$, to said storage location j by applying a predetermined tour sequence of shuffle operations to said memory, wherein each successive datum $d+1, d+2, \ldots, N-1$, is accessed with each shuffle operation.

19. The method of claim 17 wherein said sequence of shuffle operations is generated in accordance with the relationships $$x = \rho^{r-t}(d \oplus w_{k,t}) \oplus j \oplus k, \text{ for } N=2^r$$

and $$x = 2^{q+t}(w_{k,t}-d) + 2^q a, \text{ for } N=2m-1,$$

where $$a = (j-k)m^q - k \sum_{h=1}^{q} m^h, \quad q = \Gamma_2(N),$$

m is a positive integer, and x is a binary number defining said sequence of shuffle operations.

20. The method of claim 19 wherein said sequence of shuffle operations is defined by the values of the bits of the binary number x, wherein a bit value of 1 corresponds to an In Shuffle operation and a bit value of 0 corresponds to an Out Shuffle operation.

21. The method of claim 16 wherein said determining step further comprises the step of determining the address of said index datum, $w_{k,t}$ from the relationships $$w_{k,t} = w_{k,t-1} \oplus \rho^{t-1}(k) \oplus \rho^t(k) \oplus \delta(S)\rho^t(1)$$

for $N=2^r$, and $$w_{k,t} = w_{k,t-1} - km^t - \delta(S)m^t,$$

for $N-2m-1$, where S is the shuffle performed at time $t-1$ and $$\delta(S) = \begin{cases} 0, \text{ for } S = \text{Out Shuffle} \\ 1, \text{ for } S = \text{In Shuffle}. \end{cases}$$

* * * * *